Jan. 14, 1958
G. D. UTLEY ET AL
2,819,719
BRANCHED SURGICAL DRAIN
Filed Jan. 7, 1955
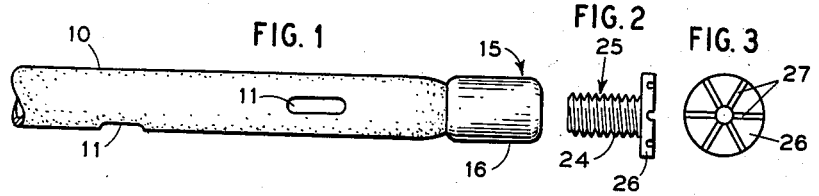
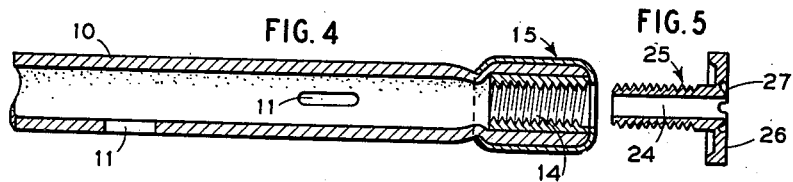
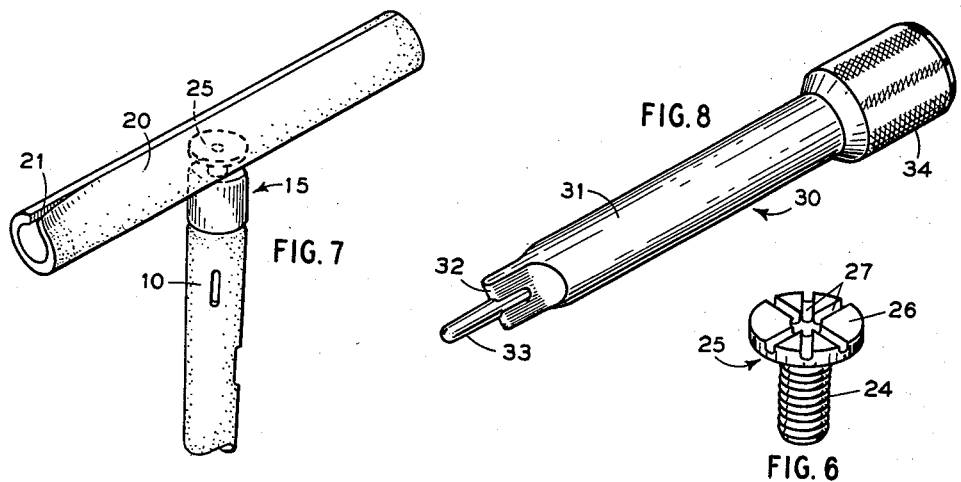
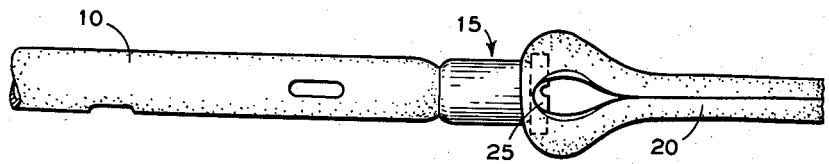
INVENTORS
GEORGE D. UTLEY
SIDNEY HIRSCH
BY
ATTORNEY

United States Patent Office 2,819,719
Patented Jan. 14, 1958

2,819,719

BRANCHED SURGICAL DRAIN

George D. Utley, Forest Hills and Sidney Hirsch, Cedarhurst, N. Y.

Application January 7, 1955, Serial No. 480,390

8 Claims. (Cl. 128—350)

This invention relates to an improvement in surgical drains of the type inserted into a body cavity, and withdrawn therefrom, through an exterior body opening such as a nasal passage.

The present invention is particularly directed to an improvement in small diameter flexible drain tubes, such as the "Levine" tube frequently used for post-operative drainage and stomach aspiration in such operative procedures as partial or subtotal gastrectomy. The invention is also applicable to common duct T-tubes used as surgical drains.

The so-called "Levine" tube is a small diameter flexible tube, of rubber or other equivalent material, provided with a catheter type tip and with longitudinally and circumferentially spaced small openings. As used in gastrectomy procedures, the tube is preoperatively inserted into the stomach through the nasal passage.

In accordance with the invention, the catheter type tip of a "Levine" tube is replaced by a flush, internally threaded metal collar. This collar may comprise a unitary member or may be a composite assembly of an internally threaded nipple clamped into the tube by a flush metal collar. The branches are formed by a relatively short (6") piece of soft rubber drainage tubing which is slit longitudinally along one wall. The opposite wall, intermediate the ends of the branch tubing, is formed with a minute opening through which is inserted a threaded screw. This screw has a tubular stem, and the outer surface of its head is formed with a plurality of radial grooves intersecting the stem passage. By using a novel key engageable with the screw head, the screw is threaded tightly into the collar on the main tube, thus connecting the branch tube to the main tube. Due to the flexibility of its wall, the branch tube closes the slit in its side wall.

The invention branch drain tube is used as follows. The main drain having the threaded collar on its inner end but without having the branch tube attached thereto, is placed into the stomach through the nose preoperatively in the usual manner. At the operating table, and at the time of gastrectomy, after the closure of the posterior wall and before the closure of the anterior anastomosis, the main tube, which is in the stomach, is pulled into the wound and the branch tube attached by threading the tubular stem screw tightly into the collar. The limbs of the branch tube are then appropriately placed in the afferent and efferent loops of the anastomosis, after which the anterior closure of the anastomosis is completed.

This procedure permits decompression of the afferent and efferent loops and may be helpful in preventing the occasional duodenal blow-out. Its position in the efferent loop may be helpful in a complicating ileus or in a distal obstruction from any cause. In addition, if there is temporary obstruction of the anastomotic stoma, the tube will facilitate feeding since its T limb is beyond the stoma. At the desired time, the assembled tube is easily withdrawn through the nose because the T junction collapses without any difficulty.

For a more complete understanding of the invention principles, reference is made to the following description of a typical embodiment thereof as illustrated in the accompanying drawings.

In the drawings:

Fig. 1 is a partial side elevation of the main drain tube formed in accordance with the invention;

Figs. 2 and 3 are side and end elevation views, respectively, of the tubular stem attaching screw;

Fig. 4 is a longitudinal sectional view through the main tube;

Fig. 5 is a longitudinal sectional view through the attaching screw;

Fig. 6 is a perspective view of the attaching screw;

Fig. 7 is a perspective view of the assembly after the branch tube has been attached to the main tube;

Fig. 8 is a perspective view of the "key" for operating the attaching screw; and Fig. 9 is a side elevation view of the assembly as it is withdrawn, illustrating how the branch tube collapses.

Referring to the drawing, a drain tube of the "Levine" type, as modified in acordance with the invention, is illustrated at 10 as having longitudinally and circumferentially spaced drain openings 11. The usual catheter type tip of tube 10 is removed and, in the specific embodiment illustrated, a collar assembly 15, comprising an internally threaded nipple 14 and a flush clamping collar 16, is secured to the inner end of tube 10. To effect this, nipple 14 is inserted into tube 10, and collar 16 is slipped over the tube end and clamped tightly thereon to compress the tube wall against nipple 14. It should be understood that collar assembly 15 may, with equal facility, be formed as an integral unit including nipple 14 and collar 16.

To form the head 20 of the T, a short length (6" for example) of small diameter flexible tubing, of soft rubber or the equivalent, is slit along one side as at 21 (Fig. 7). The opposite side of branch tube 20, intermediate its ends, is formed with a minute opening to receive the tubular threaded stem 24 of a screw 25 having a head 26 whose outer surface is formed with a plurality of radial grooves 27 intersecting the interior of stem 24.

To utilize the invention drain in a gastrectomy, tube 10 with collar assembly 15 is preoperatively inserted through a nasal passage, as previously described, and drawn into the wound before the anterior opening is closed. Branch tube 20 is then attached to collar assembly 15 by inserting the stem 24 of screw 25 through the branch tube opening and threading stem 24 into nipple 14.

Driving of screw 25 is effected by the tool 30 shown in Fig. 8. This tool comprises a relatively elongated shank 31 having a flattened inner end portion 32 from which projects a stem 33. The outer end of shank 31 carries a knurled operating handle 34. To drive screw 25, stem 33 is inserted into the tubular stem 24 of the screw, and portion 32 engaged in aligned grooves 27. This affords a firm and non-slipping driving connection between screw 25 and tool 30.

As best seen in Fig. 9, the T-tube can be easily withdrawn through the nasal passage as the split branch tube 20 collapses and flattens during such withdrawal.

The application of the invention to a "Levine" tube has been described in detail to illustrate a specific application of the principles of the invention. However, such principles are applicable equally to common duct drainage devices. In the latter case, the T-tube or branch tube is of the same material as the main tube, and the latter need not be formed with the openings 11 or with a catheter-type tip. The threaded collar 15 is secured to the tube and the branch tube secured thereto by the screw 25.

While a specific embodiment of the invention has been shown and described in detail to illustrate the application of the invention principles, it should be understood that the invention may be otherwise embodied without departing from such principles.

What is claimed is:

1. A surgical drain comprising, in combination, a flexible wall main tube insertable through a body opening into a body cavity; a substantially flush collar means secured on the inner end of said main tube; a flexible wall branch tube slit longitudinally along one side and having a small opening in its opposite side; and a fastener having a tubular stem inserted through such opening for securement in said collar to connect said branch and main tubes and establish communication therebetween; the arms of said branch tube flattening about said fastener, as the drain is withdrawn through such body opening, by virtue of such longitudinal slitting.

2. A surgical drain comprising, in combination, a flexible wall main tube insertable through a body opening into a body cavity; a substantially flush internally threaded collar means secured on the inner end of said main tube; a flexible wall branch tube slit longitudinally along one side and having a small opening in its opposite side; and a fastener having a tubular threaded stem inserted through such opening for securement in said collar to connect said branch and main tubes and establish communication therebetween; the arms of said branch tube flattening about said fastener, as the drain is withdrawn through such body opening, by virtue of such longitudinal slitting.

3. A surgical drain comprising, in combination, a flexible wall main tube insertable through a body opening into a body cavity; a substantially flush collar means secured on the inner end of said main tube; a flexible wall branch tube slit longitudinally along one side and having a small opening in its opposite side; and a fastener having a tubular stem inserted through such opening for securement in said collar and a head disposed in said branch tube and formed with passage means communicating with the interior of said stem, to connect said branch and main tubes and establish communication therebetween; the arms of said branch tube flattening about said fastener, as the drain is withdrawn through such body opening, by virtue of such longitudinal slitting.

4. A surgical drain comprising, in combination, a flexible wall main tube insertable through a body opening into a body cavity; a substantially flush internally threaded collar means secured on the inner end of said main tube; a flexible wall branch tube slit longitudinally along one side and having a small opening in its opposite side; and a fastener having a tubular threaded stem inserted through such opening for securement in said collar and a head disposed in said branch tube and formed with passage means communicating with the interior of said stem, to connect said branch and main tubes and establish communication therebetween; the arms of said branch tube flattening about said fastener, as the drain is withdrawn through such body opening, by virtue of such longitudinal slitting.

5. A surgical drain comprising, in combination, a flexible wall main tube insertable through a body opening into a body cavity; a substantially flush internally threaded collar means secured on the inner end of said main tube; a flexible wall branch tube slit longitudinally along one side and having a small opening in its opposite side; and a fastener having a tubular threaded stem inserted through such opening for securement in said collar and a head disposed in said branch tube and formed with diametrically aligned radial grooves in its outer surface communicating with the interior of said stem, to connect said branch and main tubes and establish communication therebetween; the arms of said branch tube flattening about said fastener, as the drain is withdrawn through such body opening, by virtue of such longitudinal slitting.

6. A surgical drain as claimed in claim 5 in which said collar means includes an internally threaded nipple inserted in said main tube and a collar fitting over said main tube and clamping the main tube wall against said nipple.

7. A surgical drain as claimed in claim 5 in which the branch tube opening is intermediate its ends.

8. A surgical drain as claimed in claim 5 in which the main tube has longitudinally and circumferentially spaced drain openings adjacent said collar means.

References Cited in the file of this patent

UNITED STATES PATENTS

| | | |
|---|---|---|
| 1,497,722 | Holst-Grubbe | June 17, 1924 |
| 2,329,398 | Duffy | Sept. 14, 1943 |
| 2,618,271 | Wallace | Nov. 18, 1952 |

FOREIGN PATENTS

| | | |
|---|---|---|
| 3,825 | Great Britain | Nov. 3, 1875 |